April 27, 1954 M. L. M. VANSTEENKISTE 2,676,921
WATER FILTERS
Filed May 26, 1950

INVENTOR.
MARY L. M. VANSTEENKISTE
BY
L. S. Saulsbury
ATTORNEY

Patented Apr. 27, 1954

2,676,921

UNITED STATES PATENT OFFICE 2,676,921

WATER FILTER

Mary L. M. Vansteenkiste, Montgeron, France

Application May 26, 1950, Serial No. 164,319

4 Claims. (Cl. 210—16)

This invention relates to water filters and more particularly to a water filter adapted for use in an aquarium.

With prior water filters such as have been used in fish aquariums, it has been found that because of the use of large bubbles of air being extended into the lower end of a relatively small outlet flow tube of the filter and of such diameter that the bubbles would fill the same, that a deposit of calcium carbonate or other salt or compound would result along the sides of the relatively small outlet tube and eventually would restrict the flow of the water therethrough. When this would result, it either became necessary to dispose of the filter or to cut away the deposit on the interior surface of the small outlet tube through which the bubbles passed.

It is accordingly the object of this invention to provide a water filter especially adapted for use in aquariums wherein the clogging of the outlet tube thereof would be minimized and if possible eliminated.

It is another object of the present invention to increase the water flow through a filter of this type and at the same time give better aeration of the water within the aquarium.

Other objects of the present invention are to provide a water filter for fish aquariums which is of simple construction, inexpensive to manufacture, compact, has a minimum number of parts, easy to assemble, easy to support within the aquarium, compact and efficient in operation.

For other objects and for a better understanding of the invention, reference may be had to the following detailed description taken in connection with the accompanying drawing, in which Fig. 1 is a fragmentary sectional view of an aquarium and of one form of water filter embodying the features of the present invention.

Figure 1:
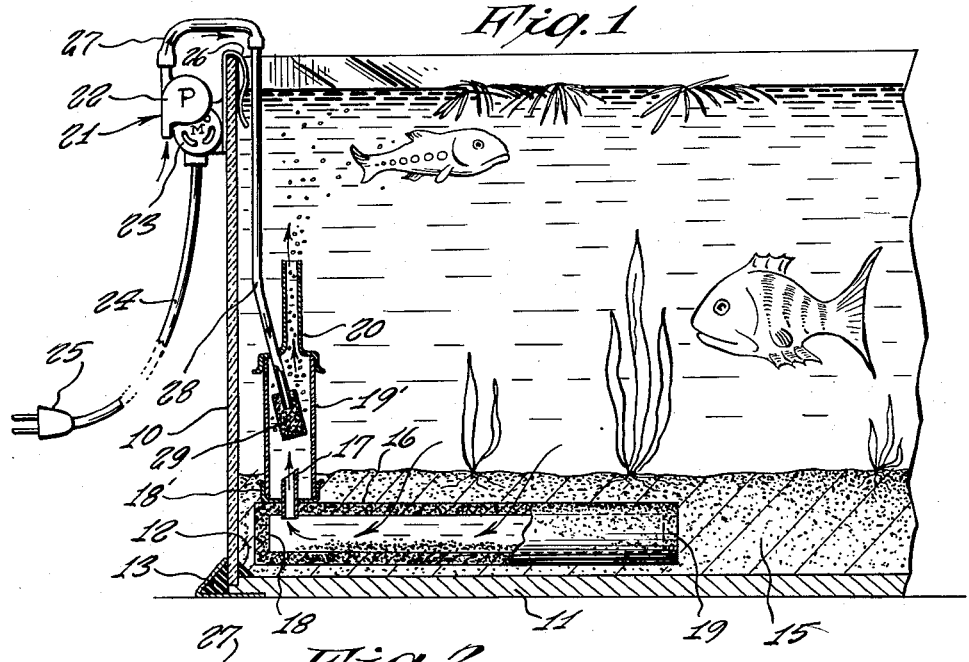

Referring now particularly to Fig. 1, 10 represents an aquarium wall which is open at the top and to the lower end of which there is connected a bottom 11. Between the bottom and the lower end of the wall 10 is an internal sealing member 12 and an external sealing member 13. The external sealing member 13 is held in place by a bent molding strip 14 that surrounds the entire bottom of the aquarium. On the bottom of the aquarium is a layer of sand, as indicated at 15, and into this sand there is embedded a hollow porous cylinder 16 into which water from the aquarium may pass. This water will be filtered through the sand and through the porous wall of the cylinder 16. Within this cylinder there are preferably provided particles of carbon to absorb certain of the impurities of the water passing through the filter and not removed by the sand or the wall of the cylinder.

Extending vertically from one end of the porous cylinder is an outlet tube 17 through which the water is drawn, the ends of the cylinder being closed as indicated at 18 and 19. Surrounding this tube 17 and resting upon the porous cylinder 16 is a cup-shaped supporting plate or member 18' for receiving and supporting a large vertically extending cylinder 19'. The water will flow into this cylinder 19' and fill the same and pass outwardly through a nozzle cap 20. The water flow is caused by the presence of air being supplied to the large tube 19'. This air is supplied by a motor pump device 21 having a pump 22 and an electric motor 23. The electric motor is connected by an electric cord 24 and a plug 25 to a wall receptacle. The device 21 is supported on the edge of the aquarium wall 10 by a clip bracket 26. To the pump 21 there is connected a rubber hose 27 that extends over the upper edge of the aquarium wall 10. A glass or plastic tube 28 extends from the rubber hose 27 and this tube has a cylindrical shaped porous block 29 connected to its lower end. This porous block or head 29 will give off a great volume of small bubbles of air so that a constant chain of them will pass upwardly through the nozzle cap 20. This air, as it leaves the nozzle cap, leaves space for water to enter the cylinder 19' whereby the water flow through the filter is maintained. This air not only maintains the flow of water in the filter, but also aerates the water. The provision of the small air bubble flow and the large cylinder tube 19' makes possible a filter construction which will not become clogged. In the opposite case of a small cylinder tube and large bubbles passing upwardly through the tube, calcium compounds deposit heavily upon the inner wall of the tube. The tube 28 extends through an opening in the nozzle cap 20. The porous block 29 can remain as a separate unit and can be fitted to the end of the glass or plastic tube 28. The block 29 can be made from a mass of small granules fused or pressed together to comprise a self-contained solid block having a great number of small pores through which air is projected in such a manner as to give off very small bubbles.

Figure 2:
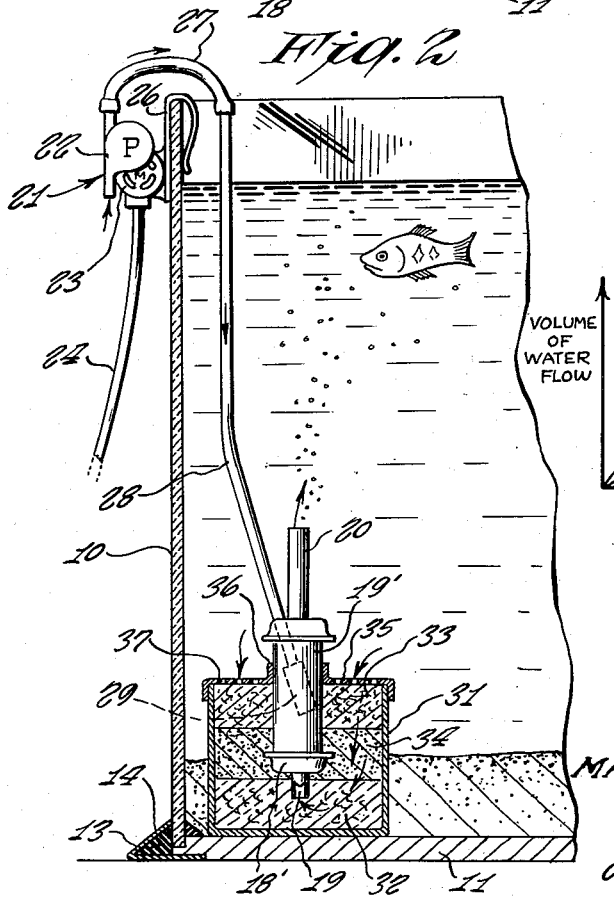
Fig. 2 is a fragmentary sectional view of an aquarium and of a filter of a different type embodying the features of the present invention.

Referring now to Fig. 2, there is shown a slightly different type of a filtering arrangement. A cup-shaped container 31 is provided with bottom and top layers of glass wool, as indicated at 32 and 33, and with an intermediate layer of carbon particles, as indicated at 34. Over the top of the cup-shaped member 31 there is fixed a cap 35 having a flanged central opening 36 and perforations 37. Water, as indicated by the arrows, passes downwardly through the perforations 37 and through the layers of material lying within the cup-shaped member or receptacle 31. This member is supported upon the bottom of the aquarium tank.

The tube 19' extends through the flanged opening 36 of the cap 35 and fills the same and is embedded in the layers of material lying within the receptacle. The lower end of the tube 19' has the bottom cap 18' thereon with the small tube 19 depending therefrom. The water, after having passed through the layers of the material within the cup-shaped member 31, passes upwardly into the tube 19 where it is mixed with the air delivered through the block 29 for its outward flow through the nozzle 20. The principle of operation of this filter is the same as that above discussed and the only difference lies in the arrangement of the filtering material about the vertically extending cylinder arrangement 19.

Figure 3:
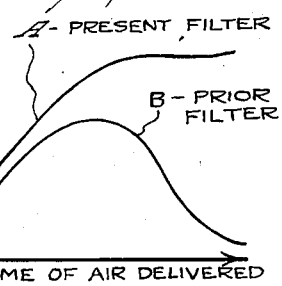
Fig. 3 is a graph plotting liquid volume against air supplied and showing curves indicating the present filter and for prior conventional filters.

In Fig. 3, there is plotted curves of volume of air delivered against the volume of the water flow. Curve A is for the present filter while curve B represents the curve for the prior filter using a small cylinder and large bubbles. It will be seen that the volume flow of water through the filter has been increased by the use of small air bubbles and by the use of a large diameter cylinder 19'. With the large bubbles, as will be indicated with the outer end of the curve B, the volume flow of water may be cut off while with the present filter this volume flow reaches its maximum and remains at this capacity. The present filter thus out-performs the prior filter as exemplified by these curves.

It should now be apparent that there has been provided a water filter for fish aquariums which is of simple construction, has a minimum number of parts and wherein there is little opportunity for the same to become clogged by the calcium compounds of the water and wherein the cleaning of the filter becomes seldom necessary.

While various changes may be made in the detail construction, it shall be understood that such changes shall be within the spirit and scope of the present invention as defined by the appended claims.

I claim:

1. In a water filter adapted for use in aquariums, a filtering unit adapted to be embedded in sand to receive and filter water, a large outlet chamber tube communicating with the interior of said unit, a nozzle extending from said chamber tube, an air delivery tube extending into said chamber tube and said air delivery tube having a block of porous material for the purpose of emitting small air bubbles and said filtering unit comprising a cup-shaped container and having bottom and top layers of glass wool, intermediate layer of carbon particles and a cap provided with perforations whereby the water may pass downwardly through said perforations and through said layers lying within said container.

2. A water filter for aquariums as defined in claim 1, said cap having a flanged central opening adapted to receive the large outlet chamber tube whereby said tube is embedded in layers lying within the container, said tube having on the lower end thereof a bottom cap secured thereto and a small tube extending from said bottom cap.

3. In a water filter adapted for use in aquariums, a filtering mass of porous material adapted to receive and filter water, said mass adapted to be embedded in sand and closed at both ends, particles of loose filtering material located within said mass, a large outlet chamber tube of non-porous material communicating with the interior of said mass, a nozzle extending from said chamber tube, an air delivery tube extending into said chamber and having a block of porous material at the end for the purpose of emitting small air bubbles within said large outlet chamber tube.

4. In a water filter adapted for use in aquariums, a hollow filtering mass of porous material adapted to receive and filter water, a large outlet chamber tube of non-porous material communicating with the interior of said mass, a nozzle extending from said chamber tube, an air delivery tube extending into said chamber and said air delivery tube having a block of porous material at the end for the purpose of emitting small air bubbles within said large outlet chamber tube, said filtering mass comprising a hollow member of the self-contained type adapted to be embedded in sand and closed at its ends, the means for connecting the large chamber tube to the hollow filtering mass comprising a bottom cap secured to the large tube at the lower end thereof and a small tube extending from the cap into the hollow space within the filtering mass.

References Cited in the file of this patent

UNITED STATES PATENTS

| Number | Name | Date |
|---|---|---|
| 44,876 | McKnight | Nov. 1, 1864 |
| 754,317 | Kaltenegger et al. | Mar. 8, 1904 |
| 880,783 | Erlwein et al. | Mar. 3, 1908 |
| 950,999 | Erlwein et al. | Mar. 1, 1910 |
| 1,055,082 | Rogers | Mar. 4, 1913 |
| 1,574,783 | Beth | Mar. 2, 1926 |
| 1,936,305 | Leffler | Nov. 21, 1933 |
| 2,008,363 | Moris | July 16, 1935 |
| 2,137,397 | Haldeman | Nov. 22, 1938 |
| 2,275,428 | Haldeman | Mar. 10, 1942 |
| 2,293,051 | Duffy | Aug. 18, 1942 |
| 2,335,756 | Haldeman | Nov. 30, 1943 |
| 2,491,853 | Feldman | Dec. 20, 1950 |
| 2,515,538 | Wall | July 18, 1950 |
| 2,533,936 | Holmes et al. | Dec. 12, 1950 |

FOREIGN PATENTS

| Number | Country | Date |
|---|---|---|
| 849,043 | France | Nov. 13, 1939 |